United States Patent [19]

Shriver et al.

[11] Patent Number: 4,876,294

[45] Date of Patent: Oct. 24, 1989

[54] FOUNDRY BINDER SYSTEMS BASED UPON ACRYLATED EPOXY RESINS AND EPOXY RESINS

[75] Inventors: H. Randall Shriver, Gahanna; William R. Dunnavant, Worthington, both of Ohio; Bruce A. Gruber, Emmaus, Pa.

[73] Assignee: Ashland Oil, Inc., Ashland, Ky.

[21] Appl. No.: 243,672

[22] Filed: Sep. 13, 1988

[51] Int. Cl.[4] .............................. C08K 3/36; B22C 9/02
[52] U.S. Cl. ..................................... 523/139; 523/148; 523/455; 164/16
[58] Field of Search ........................ 523/139, 148, 455; 164/16, 527

[56] References Cited

U.S. PATENT DOCUMENTS

| | | | |
|---|---|---|---|
| 4,518,723 | 5/1985 | Woodson | 523/139 |
| 4,526,219 | 7/1985 | Dunnavant et al. | 523/139 |
| 4,806,576 | 2/1989 | Woodson | 523/139 |

FOREIGN PATENT DOCUMENTS 62-151241  7/1987  Japan ..................................... 164/526

*Primary Examiner*—Lewis T. Jacobs
*Attorney, Agent, or Firm*—David L. Hedden

[57] ABSTRACT

The subject invention relates to foundry binder systems, which are cured with gaseous sulfur dioxide, comprising as separate components:

1. a blend of an acrylated epoxy resin and a monoester solvent and;
2. an organic solvent; and a blend of an epoxy resin and an aromatic hydrocarbon solvent which is part of component (a), (b), or both.

The invention also relates to the use of the foundry binder systems to prepare foundry mixes, foundry shapes, and metal articles.

14 Claims, No Drawings

FOUNDRY BINDER SYSTEMS BASED UPON ACRYLATED EPOXY RESINS AND EPOXY RESINS

TECHNICAL FIELD

This invention relates to foundry binder systems, which cure in the presence of gaseous sulfur dioxide, comprising as separate components: (a) a blend of an acrylated epoxy resin and a monoester solvent; (b) an oxidizing agent; and a blend of an epoxy resin and aromatic hydrocarbon solvent which is part of component (a), (b), or both. Preferably component (a), (b), or both contain a diester solvent. The invention also relates to the use of such systems to prepare foundry binders, foundry mixes, foundry shapes, and metal articles.

BACKGROUND OF THE INVENTION

Foundry binder systems which cure with gaseous sulfur dioxide are known in the art. U.S. Pat. No. 3,879,339 for instance discloses that certain synthetic resins can be cured in the presence of an oxidizing agent and sulfur dioxide. Examples of such resins are furan, urea formaldehyde, and phenol formaldehyde resins.

On the other hand, U.S. Pat. No. 4,526,219 discloses that certain ethylenically unsaturated materials can be cured by a free radical mechanism in the presence of an oxidizing agent and sulfur dioxide. Additionally, U.S. Pat. No. 4,518,723 discloses that blends of epoxy resins and certain ethylenically unsaturated materials can be cured in the presence of an oxidizing agent and gaseous sulfur dioxide.

It is clear from U.S. Pat. Nos. 4,525,219 and 4,518,723 that the systems disclosed therein, preferably incorporate significant amounts of ethylenically unsaturated monomers, generally trimethylolpropane triacrylate, as a reactive diluent, in order to obtain the desired physical properties for the foundry shapes made with these binder systems.

All of the systems described have the advantages of extended benchlife and foundry shapes can be made with the binder systems with excellent physical properties.

A problem with the systems which utilize trimethylolpropane triacrylate as the reactive diluent is that they are expensive. Therefore, it would be desirable to eliminate or at least minimize the use of such ethylenically unsaturated monomers. This has not been possible in the past without significantly sacrificing the physical properties of the foundry shapes made with the binder systems.

SUMMARY OF THE INVENTION

The subject invention relates to two component foundry binder systems, which cure in the presence of sulfur dioxide, comprising:
(a) a blend comprising a acrylated epoxy and a monoester solvent;
(b) an oxidizing agent; and a blend of an epoxy resin and aromatic hydrocarbon solvent which is part of component (a), (b), or both.
Preferably component (a), (b), or both contain a diester solvent.

It has been found that the subject foundry binders can be used to produce acceptable foundry shapes without using trimethylolpropane triacrylate or other such ethylenically unsaturated monomers. They also have excellent shelf stability and wide mixing ratios.

The foundry binders are used for making foundry mixes. The foundry mixes are used to make foundry shapes which are used to make metal castings.

BEST MODE AND OTHER MODES OF THE INVENTION

Acrylated epoxy resins and their methods of the preparation are known in the art. Essentially they are prepared by reacting an epoxy resin with acrylic acid, generally at elevated temperatures. They may be partially esterified, but are preferably totally esterified. The epoxy resins which can be used to prepare the acrylated epoxy resins are described in U.S. Pat. No. 4,518,723 at column 4, line 20 to column 5, line 50 which is hereby incorporated by reference into this disclosure.

The acrylated epoxy resin is blended with a monoester solvent. Examples of such solvents are propylene glycol monomethyl ether acetate, ethylene glycol monomethyl ether acetate, n-butyl propionate, ethyl 3-ethoxy propionate, and the like. The amount of monoester used is from 15 to 75 weight percent, preferably from 25 to 35 weight percent based upon the weight of the acrylated epoxy resin. Preferably used as the polar solvent is propylene glycol monomethyl ether acetate.

The other component of the foundry binder system is an oxidizing agent. Numerous oxidizing agents are suitable for use with the acrylated epoxy resins and epoxy resins. Suitable oxidizing agents include peroxides, hydroperoxides, hydroxy hydroperoxides, chlorates, perchlorates, chlorites, hydrochlorides, perbenzoates, permanganates, etc. Preferably, however, the oxidizing agent is a peroxide, hydroperoxide or a mixture of peroxide or hydroperoxide with hydrogen peroxide. The organic peroxides may be aromatic or alkyl peroxides. Examples of useful diacyl peroxides include benzoyl peroxide, lauroyl peroxide and decanoyl peroxide, Ketone peroxides are particularly useful and these include methyl ethyl ketone peroxide, isobutyl methyl ketone peroxide, and 2, 4-pentane dione peroxide. Examples of peroxy ester oxidizing agents include t-butyl peroctoate, t-butyl peracetate, t-butyl perbenzoate and t-amyl peroctoate. Examples of alkyl peroxides include dicumyl peroxide and di-t-butyl peroxide. Example of hydroperoxides useful in the invention include t-butyl hydroperoxide, cumene hydroperoxide, paramenthane hydroperoxide, etc. Mixtures of one or more of the above organic peroxides or hydroperoxides can be utilized with hydrogen peroxide as curing or hardening agents or accelerators. The compositions of the invention will contain from about 5 to about 40 percent by weight, preferably 10 to 25 percent by weight, of the oxidizing agent based on the total weight of acrylated epoxy resin and epoxy resin.

Component (a), (b), or both contain a blend of an epoxy resin and aromatic hydrocarbon solvent. The epoxy resins used are disclosed at column 4, line 20 to column 5, line 50 of U.S. Pat. No. 4,518,723. They are the same resins mentioned in connection with the acrylated epoxy resins. The amount of epoxy resin used is from 20 to 80 weight percent, preferably from 30 to 65 weight percent based upon the total weight percent of epoxy resin and acrylated epoxy resin.

Suitable aromatic hydrocarbon solvents include benzene, toluene, xylene, ethylbenzene, naphthalenes, mixtures thereof, and the like. As was mentioned previously, the aromatic hydrocarbon solvent is added to the epoxy resin. However, in some cases, it is also preferred to add some of the aromatic hydrocarbon solvent to component (a), particularly when the epoxy resin is part of component (b). Generally, the viscosity of component (a) should not exceed 1,000 centipoise, preferably 300 centipoise.

In some formulations, performance improvements result if a diester solvent is added to component (a), (b) or both. Diester solvents, which can be used are esters of aliphatic and aromatic dicarboxylic acids. Particularly preferred esters are esters wherein the alkyl group contains from six to twelve carbon atoms. Examples of such esters include dioctyl adipate, diisononyl adipate, dioctyl phthalate, n-decyl adipate, and diisononyl phthalate.

The amount of aromatic hydrocarbon solvent and diester solvent used in components (a) and (b) can vary over wide ranges. Generally, however, the total amount aromatic hydrocarbon solvent is used in an amount of 5 to 25 weight percent based upon the total weight of acrylated epoxy and epoxy resin, preferably from 10 to 20 weight percent. The diester solvent is generally used in an amount of 4 to 16 weight percent based upon the total weight of the acrylated epoxy and epoxy resin, preferably from 8 to 12 weight percent.

The curing agent for the foundry binder system is gaseous sulfur dioxide. Generally, the two components of the foundry binder system are mixed with sand in a conventional manner. The sand mix is then formed into a desired foundry shape by ramming, blowing, or other known foundry core and mold making methods. The shaped article is preferably then exposed to 100 percent gaseous sulfur dioxide, although minor amounts of a carrier gas may also be used. This gas is present in catalytic amounts. The exposure time of the sand mix to the gas can be as little as ½ second or less and the binder component cures on contact with the catalytic agent.

It will be apparent to those skilled in the art that other additives such as silanes, silicones, benchlife extenders, release agents, defoamers, wetting agents, etc. can be added to the aggregate, or foundry mix. The particular additives chosen will depend upon the specific purposes of the formulator.

When preparing an ordinary sand-type foundry shape, the aggregate employed has a particle size large enough to provide sufficient porosity in the foundry shape to permit escape of volatiles from the shape during the casting operation. The term "ordinary sand-type foundry shapes", as used herein, refers to foundry shapes which have sufficient porosity to permit escape of volatiles from it during the casting operation.

Generally, at least about 80% and preferably about 90% by weight of aggregate employed for foundry shapes has an average particle size no smaller than about 0.1 mm. The aggregate for foundry shapes preferably has an average particle size between about 0.1 mm and about 0.25 mm. The preferred aggregate employed for ordinary foundry shapes is sand wherein at least about 70 weight percent and preferably at least about 85 weight percent of the sand is silica. Other suitable aggregate materials include zircon, olivine, aluminosilicate, chromite, and the like.

When preparing a shape for precision casting, the predominant portion and generally at least about 80% of the aggregate has an average particle size no larger than 0.1 mm and preferably between about 0.04 mm and 0.075 mm. Preferably at least about 90% by weight of the aggregate for precision casting applications has a particle size no larger than 0.1 mm and preferably between 0.04 mm and 0.075 mm. The preferred aggregates employed for precision casting applications are fused quartz, zircon, magnesium silicate, olivine, and aluminosilicate.

When preparing a refractory such as a ceramic the predominant portion and at least 80 weight percent of the aggregate employed has an average particle size under 0.075 mm and preferably no smaller than 0.04 mm. Preferably at least about 90% by weight of the aggregate for a refractory has an average particle size under 0.075 mm and preferably no smaller than 0.04 mm. The aggregate employed in the preparation of refractories must be capable of withstanding the curing temperatures such as above about 815 degrees Centigrade which are needed to cause sintering for utilization. Examples of some suitable aggregate employed for preparing refractories include the ceramics such as refractory oxides, carbides, nitrides, and silicides such as aluminum oxide, lead oxide, chromic oxide, zirconium oxide, silica, silicon carbide, titanium nitride, boron nitride, molybdenum disilicide and carbonaceous material such as graphite. Mixtures of the aggregate can also be used, when desired, including mixtures of metals and ceramic.

Examples of some abrasive grains for preparing abrasive articles include aluminum oxide, silicon carbide, boron carbide, corundum, garnet, emery, and mixtures thereof. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic fillers has an average particle size no greater than 0.075 mm. It is most preferred that at least about 95% of the inorganic filler has an average particle size no greater than 0.075 mm. Some inorganic fillers include cryolite, fluorospar, silica, and the like. When an inorganic filler is employed along with the abrasive grit, it is generally present in amounts from about 1% to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate.

The aggregate constitutes the major constituent and the binder constitutes a relatively minor amount of the foundry mix. In ordinary sand-type foundry applications, the amount of binder is generally no greater than about 10% by weight and frequently within the range of about 0.5% to about 7% by weight based upon the weight of the aggregate. Most often, the binder content ranges from about 0.6% to about 5% by weight based upon the ranges from about 0.6% to about 5% by weight based upon the weight of the aggregate in ordinary sand-type foundry shapes.

In molds and cores for precision casting applications the amount of binder is generally no greater than about 40% by weight and frequently within the range of about 5% to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

EXAMPLES

The examples which follow will illustrate specific embodiments of the invention. These examples along with the written description will enable one skilled in the art to practice the invention. It is contemplated that many equivalent embodiments of the invention will be operable besides these specifically disclosed.

All parts are parts by weight unless otherwise specified, and temperatures are in degrees Centigrade unless otherwise specified. The examples set forth describe various embodiments of the invention, but they are not intended to imply that other embodiments will not work effectively.

The abbreviations used in the examples are as follows: AER = a totally acrylated epoxy resin having an average molecular of approximately 500 prepared from bisphenol F and acrylic acid.
AHS = a mixture of aromatic hydrocarbon solvents known as HI-SOL 15.
ER = epoxy resin prepared from bisphenol F having an average molecular weight of about 340.
CA = Cellosolve acetate.
CHP = cumene hydroperoxide.
DOA = dioctyl adipate.
ME = monoester
PMA = monoester solvent known as propylene glycol monomethyl ether acetate.

TABLE I which follows, discloses the ingredients and amounts used in components (a) and (b) of the foundry binder system. The ingredients were combined according to conventional means.

A foundry mix was prepared by mixing components (a) and (b) with Wedron 540 sand. Approximately 1.2 percent by weight of the foundry binder system was used, said weight being based upon the weight of the sand.

The resulting foundry mix was formed into standard AFS tensile test samples (dogbones) according to standard procedures by blowing it into a corebox and contacting it with sulfur dioxide according to the cold-box process. Measuring the tensile strength of the dog bone samples enables one to predict how the mixture of sand and binder system will work in actual foundry operations.

In the examples which follow, dog bone samples were formed from the foundry mix immediately after mixing (zero bench). Then tensile strengths of the various cured samples were measured immediately (IMM), 5 minutes, 2 hours, and 24 hours after curing. Some of the dog bone samples that were formed from freshly prepared (zero bench) foundry mixes were stored for 24 hour at a relative humidity (RH) of 100% and a temperature of 25 degrees Centigrade before measurement of the tensile strength. Tensile strengths of the dog bone sample are given in TABLE I.

TABLE I

| EXAMPLE | COMPONENT A | | COMPONENT B | | | % ME BASED ON AER & ER | RATIO ME/AHS | TENSILES (psi) | | | | 24 HR (100% RH) |
|---|---|---|---|---|---|---|---|---|---|---|---|---|
| | AER | PMA | ER | AHS | CHP | | | IMM | 5 MIN | 2 HR | 24 HR | |
| A | 30 | 9.4 | 32.5 | — | 15.0 | 15 | — | 71 | 76 | 77 | 92 | 47 |
| B | 30 | 15.6 | 32.5 | — | 15.0 | 25 | — | 79 | 74 | 85 | 101 | 47 |
| C | 30 | 21.9 | 32.5 | — | 15.0 | 35 | — | 71 | 74 | 92 | 108 | 59 |
| D | 30 | 25.0 | 32.5 | — | 15.0 | 40 | — | 72 | 73 | 99 | 109 | 86 |
| E | 30 | 25.0 | 32.5 | — | 15.0 | — | — | 68 | 67 | 93 | 104 | 59 |
| 1 | 30 | 20.0 | 32.5 | 5 | 15.0 | 32 | 80:20 | 79 | 74 | 101 | 127 | 70 |
| 2 | 30 | 15.0 | 32.5 | 10 | 15.0 | 24 | 60:40 | 79 | 81 | 107 | 138 | 87 |
| 3 | 30 | 10.0 | 32.5 | 15 | 15.0 | 16 | 40:60 | 82 | 84 | 122 | 206 | 83 |
| 4 | 30 | 5.0 | 32.5 | 20 | 15.0 | 8 | 20:80 | 87 | 85 | 131 | 202 | 85 |
| *F | 30 | 25 | 32.5 | — | 15.0 | 32 | — | 66 | 60 | 99 | 143 | — |
| *5 | 30 | 10 | 32.5 | 15 | 15.0 | 16 | 40:60 | 70 | 73 | 111 | 234 | 88 |
| **6 | 30 | 11.1 | 32.5 | 8.3 | 15.0 | 18 | 57:43 | 91 | 98 | 142 | 196 | 91 |

*In Example F and 5, CA was the monoester.
**In Example 6, PMA was used as monoester, but 5.6 parts of DOA was used to replace part of AHS.

Comparison Examples A–D show the performance of cores produced by a foundry binder system cured with sulfur dioxide where a blend of an acrylated epoxy resin and epoxy resins, and varying levels of propylene monomethyl ether acetate (monoester) are mixed on sand with an oxidizing agent. These examples show that performance was not significantly affected by the amount of monoester added. Comparison Example E and Examples 1–4 show that the performance of the binder system shown in Comparison Example E is significantly improved by replacing part of the monoester solvent with HI-SOL 15, an aromatic hydrocarbon solvent. Examples F and 5 confirm that when cellosolve acetate (another monoester) is used without an aromatic hydrocarbon solvent, lower performing cores are produced than when an aromatic hydrocarbon solvent is also used (Example 5). Example 6 shows that the addition of dioctyl adipate, a diester, also improves the performance of the binder.

We claim:

1. A foundry binder system which will cure in the presence of sulfur dioxide comprising as separate components:
   (a) a blend of an acrylated epoxy resin and a monoester solvent; and
   (b) an oxidizing agent; and a blend of an epoxy resin and an aromatic hydrocarbon solvent which is part of component (a), (b), or both.

2. The system of claim 1 wherein the solvents in component (a) are present in amounts sufficient to result in a viscosity of less than 300 centipoise.

3. The system of claim 2 wherein the amount of aromatic solvent present in both components is from 10 to 20 weight percent based upon the total weight of the acrylated epoxy resin and epoxy resin.

4. The system of claim 3 wherein component (a), (b), or both contain a dibasic ester solvent.

5. The system of claim 4 wherein the dibasic ester is an ester of aliphatic or aromatic dicarboxylic acid and wherein the alkyl group of the ester contains from six to twelve carbon atoms.

6. The system of claim 6 wherein the amount of dibasic ester solvent present in both components is from 1 to 10 weight percent based upon the total weight of the acrylated epoxy resin and epoxy resin.

7. The system of claim 6 wherein the oxidizing agent is present in an amount of 10 to 25 weight percent based upon the total weight of acrylated epoxy resins and epoxy resin.

8. A foundry mix comprising:
(a) a major amount of foundry aggregate; and
(b) an effective bonding amount of the foundry binder system of claim 1.

9. A foundry mix comprising:
(a) a major amount of foundry aggregate; and
(b) an effective bonding amount of the foundry binder system of claim 2.

10. A foundry mix comprising:
(a) a major amount of foundry aggregate; and
(b) an effective bonding amount of the foundry binder system of claim 3.

11. A foundry mix comprising:
(a) a major amount of foundry aggregate; and
(b) an effective bonding amount of the foundry binder system of claim 4.

12. A foundry mix comprising:
(a) a major amount of foundry aggregate; and
(b) an effective bonding amount of the foundry binder system of claim 5.

13. A foundry mix comprising:
(a) a major amount of foundry aggregate; and
(b) an effective bonding amount of the foundry binder system of claim 6.

14. A foundry mix comprising:
(a) a major amount of foundry aggregate; and
(b) an effective bonding amount of the foundry binder system of claim 7.

* * * * *